United States Patent
Whitsitt et al.

(10) Patent No.: US 9,938,799 B2
(45) Date of Patent: Apr. 10, 2018

(54) HIGH TEMPERATURE INSULATION SYSTEM AND METHOD

(71) Applicant: FMC Technologies, Inc., Houston, TX (US)

(72) Inventors: Elizabeth Whitsitt, Houston, TX (US); Carlos Ardenis Silva-Hernandez, Houston, TX (US); Matthew R. Herst, Houston, TX (US); Warren P. Jones, Houston, TX (US); Frank Wabnitz, Houston, TX (US)

(73) Assignee: FMC Technologies, Inc., Houston, TX (US)

(*) Notice: Subject to any disclaimer, the term of this patent is extended or adjusted under 35 U.S.C. 154(b) by 0 days.

(21) Appl. No.: 14/844,550

(22) Filed: Sep. 3, 2015

(65) Prior Publication Data

US 2017/0067317 A1 Mar. 9, 2017

(51) Int. Cl.
*E21B 36/00* (2006.01)
*E21B 41/00* (2006.01)
*E21B 43/01* (2006.01)
*G06F 1/00* (2006.01)
*F16L 59/16* (2006.01)

(52) U.S. Cl.
CPC ........ *E21B 36/003* (2013.01); *E21B 41/0007* (2013.01); *E21B 43/01* (2013.01); *G06F 1/00* (2013.01); *F16L 59/166* (2013.01)

(58) Field of Classification Search
CPC ............................ E21B 36/003; E21B 41/0007
See application file for complete search history.

(56) References Cited

U.S. PATENT DOCUMENTS

| | | | | | |
|---|---|---|---|---|---|
| 3,845,662 | A * | 11/1974 | Surgina | ................. | G01K 11/06 106/31.2 |
| 4,516,520 | A * | 5/1985 | Whaley | ................. | E21B 36/003 116/217 |
| 5,732,742 | A * | 3/1998 | Mentzer | ............ | A61M 25/0612 138/149 |
| 5,795,102 | A * | 8/1998 | Corbishley | ........... | F16L 11/133 138/149 |
| 6,000,438 | A * | 12/1999 | Ohrn | ....................... | E21B 17/01 138/149 |
| 6,415,868 | B1 * | 7/2002 | Janoff | ................... | E21B 36/003 138/149 |

(Continued)

FOREIGN PATENT DOCUMENTS

WO    WO 2014028444 A2 *    2/2014    ............. B32B 27/40

*Primary Examiner* — Matthew R Buck
(74) *Attorney, Agent, or Firm* — Osha Liang LLP

(57) ABSTRACT

A method includes designing a subsea equipment assembly having an insulation covering an outer surface of at least one equipment unit and a flow path formed through the at least one equipment unit. The designing includes modeling a temperature profile of the subsea equipment assembly having a fluid within the flow path, identifying at least one hot zone along an interface between the insulation and the outer surface, where the at least one hot zone is exposed to temperatures above a degradation temperature of the insulation, and designing at least one cold zone along the interface to border the at least one hot zone, the at least one cold zone exposed to maximum temperatures below the degradation temperature of the insulation.

20 Claims, 4 Drawing Sheets

(56) References Cited

U.S. PATENT DOCUMENTS

| | | | | |
|---|---|---|---|---|
| 6,520,261 | B1* | 2/2003 | Janoff | C08K 5/16 |
| | | | | 138/141 |
| 6,978,825 | B1* | 12/2005 | Baylot | E21B 17/01 |
| | | | | 138/32 |
| 8,006,763 | B2* | 8/2011 | Bath | F16L 1/26 |
| | | | | 166/302 |
| 8,397,765 | B2* | 3/2013 | Jackson | B32B 15/08 |
| | | | | 138/137 |
| 8,714,206 | B2* | 5/2014 | Jackson | 138/137 |
| 8,857,700 | B2* | 10/2014 | Jackson | B29C 45/14336 |
| | | | | 228/199 |
| 9,004,174 | B2* | 4/2015 | Mebarkia | E21B 41/0085 |
| | | | | 166/247 |
| 2006/0016617 | A1* | 1/2006 | Corbishley | F16L 59/14 |
| | | | | 174/137 R |
| 2009/0159146 | A1* | 6/2009 | Jackson | B29C 45/14336 |
| | | | | 138/146 |
| 2013/0116962 | A1* | 5/2013 | Vestbostad | E21B 43/01 |
| | | | | 702/130 |
| 2014/0311614 | A1* | 10/2014 | Edmondson | F16L 9/14 |
| | | | | 138/140 |
| 2015/0041017 | A1* | 2/2015 | Hegdal | F16L 58/181 |
| | | | | 138/145 |
| 2015/0041018 | A1* | 2/2015 | Wan | F16L 58/181 |
| | | | | 138/149 |
| 2015/0114509 | A1* | 4/2015 | Hoffmann | F16L 58/181 |
| | | | | 138/146 |

\* cited by examiner

HIGH TEMPERATURE INSULATION SYSTEM AND METHOD

BACKGROUND

Subsea facilities used for oil and gas production and operations may include numerous pipe designs and connectors to connect units of subsea equipment together. Depending on the size of facilities, hundreds of feet of pipe may be used for connecting units of the subsea equipment, and through which fluid from production or other operations may flow. For example, a fluid flowing through the subsea equipment may include water produced along with hydrocarbons, commonly referred to as water cut. Water cut may be from seawater that is injected into a well to maintain reservoir pressure and then produced back. When the right combination of high pressure and low temperature is present, such as in deep water subsea facilities with high pressure in the equipment in the bore and low temperature environments, the mixture of produced water and hydrocarbons has the potential to form hydrates, which may form blockages in the production system.

During production, the produced fluid may flow from the well and into subsea equipment along the sea floor at a temperature well above the hydrate formation temperature. As the fluid continues to flow to a surface facility, the fluid may not have time to cool, and thus hydrate formation may not occur. However, during periods of shutdown or fluid flow stoppage, the produced fluid that remains trapped in the production equipment located above the floor of the ocean may be cooled by the surrounding seawater, which may be at temperatures close to freezing. When the fluid is cooled below hydrate formation temperature, hydrates may form in the fluid, which solidify and may cause a blockage.

Insulation around the subsea equipment has been used to delay the cooling of the hydrocarbon fluid in order to allow time to remediate the well and prevent or reduce hydrate formation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure relate to methods that include designing a subsea equipment assembly having an insulation covering an outer surface of at least one equipment unit and a flow path formed through the at least one equipment unit, where designing includes modeling a temperature profile of the subsea equipment assembly having a fluid within the flow path, identifying at least one hot zone along an interface between the insulation and the outer surface, where the at least one hot zone is exposed to temperatures above a degradation temperature of the insulation, and designing at least one cold zone along the interface to border the at least one hot zone, the at least one cold zone exposed to maximum temperatures below the degradation temperature of the insulation.

In another aspect, embodiments of the present disclosure relate to methods that include providing at least one equipment unit having a flow path extending therethrough, identifying portions along an outer surface of the at least one equipment unit exposed to temperatures above a degradation temperature of an insulation material, and disposing the insulation material around the outer surface to cover the portions exposed to temperatures above the degradation temperature and to cover adjacent portions of the outer surface exposed to maximum temperatures below the degradation temperature.

In yet another aspect, embodiments of the present disclosure relate to a subsea equipment assembly that includes a plurality of equipment units, an insulation disposed adjacent to an outer surface of at least one of the equipment units, the insulation having at least one non-interfacing surface, where each non-interfacing surface is exposed to maximum temperatures below a degradation temperature of the insulation and an interface between the insulation and the outer surface located in a hot zone exposed to temperatures above the degradation temperature of the insulation.

Other aspects and advantages of the invention will be apparent from the following description and the appended claims.

DETAILED DESCRIPTION

Figure 1:
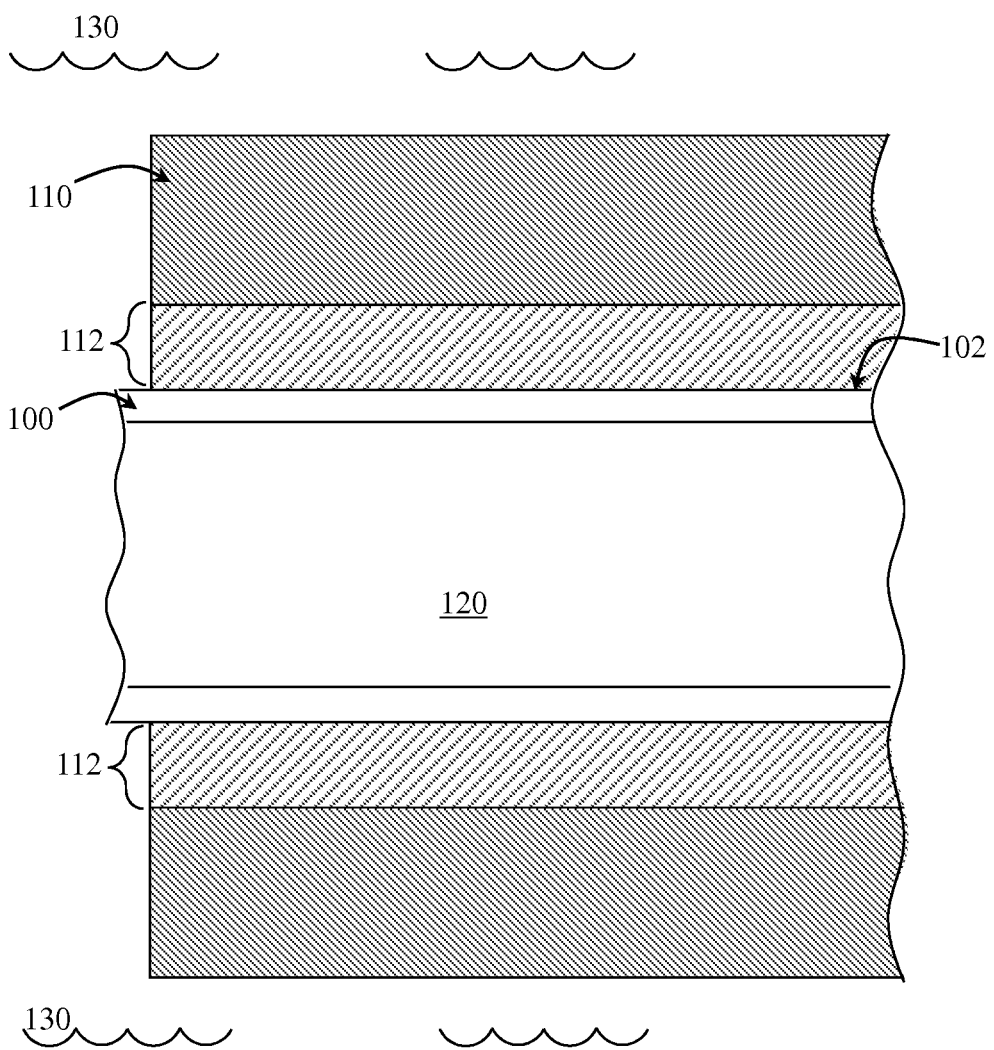
FIG. 1 is a cross sectional view of an equipment unit having a fluid therein and an insulation surrounding its outer surface in accordance with embodiments of the present disclosure.

Embodiments of the present disclosure relate generally to an insulation system and methods for designing and forming an insulation system. In more particular embodiments, an insulation system and methods for designing and forming an insulation system may relate to subsea equipment assemblies, such as for subsea wellheads, trees, manifolds and other offshore production systems used in underwater production operations.

Embodiments of the present disclosure may provide an insulation system having an extended lifetime by determining high temperature zones of the insulation system where insulation material degradation may occur, and by designing the insulation system to avoid degradation zones at surfaces of the insulation exposed to the surrounding environment. For example, prevention of degradation zones at exposed surfaces of the insulation may be achieved by covering more outer surface area of an equipment unit than would otherwise be needed. High temperature zones, or "hot zones," may be identified by determining areas along an equipment unit having fluid therein that are exposed to or subjected to temperatures greater than or equal to a temperature critical to accelerated degradation (also referred to herein as a "degradation temperature") of the insulation material. "Cold zones," may be identified by determining areas along the equipment unit that are subjected to maximum temperatures below the degradation temperature of the insulation. By designing an insulated equipment unit to have all exposed faces of the insulation subjected to maximum temperatures below the degradation temperature of the insulation, portions of the insulation interior to the exposed insulation faces that are degraded or subjected to degradation temperatures may be retained in place by the non-degraded faces. In other words, by extending insulation around hot zones to further cover the equipment unit in adjacent cold zones (areas that would otherwise not need to be insulated), the non-degraded insulation surrounding the equipment unit in the cold zones may buttress or retain any insulation material around the equipment unit in the hot zones that has degraded.

For example, in some subsea production assemblies, fluids being produced may have a higher temperature than the seabed temperature. For example, fluid may be produced having temperatures of greater than 75° C. (167° F.), greater than 100° C. (212° F.), greater than 150° C. (302° F.), or even greater than 200° C. (392° F.), while seabed temperatures may be as cold as 20° C. (68° F.), 10° C. (50° F.), or less than 5° C. (41° F.), depending on, for example, the depth of the seabed and the location of the well. A fluid may refer to liquids or mixtures of liquids, solids and/or gases, and may include, for example, hydrocarbon fluids and slurries, hydrocarbon fluids containing mixtures of water, gas and dissolved solids, water, and mixtures of different types of liquids. As production fluid flows from the reservoir to the subsea production assembly (e.g., through piping or other flow paths), the fluid temperature may decrease due to proximity to the lower seabed temperatures, which may result in formation of solid deposits from phase shifts in the fluid, such as, for example, asphaltenes, waxes or hydrates. Use of insulation around the flow path equipment for such high temperature production fluids may prevent or slow down the cooling of the high temperature production fluids to prevent or reduce formation of solid deposits (such as hydrate formation). However, when temperatures from the fluid expose the insulation to temperatures higher than the degradation temperature of the insulation material, the insulation may experience some localized degradation.

FIG. 1 shows a cross sectional view of an equipment unit 100 having a fluid 120 therein and an insulation 110 surrounding its outer surface 102. The portion of the equipment unit 100 shown in FIG. 1 is a section of piping, where the fluid 120 may flow through the piping, or may be sealed within the section of piping. When the fluid 120 heats the outer surface 102 of the equipment unit 100 to a degradation temperature of the insulation 110, the insulation 110 may begin to degrade. As used herein, degradation may include thermal degradation, thermo-oxidative degradation, hydrolytic degradation, chemical degradation or other type of break down of chemical bonds within the insulation. The inventors of the present disclosure have found that the degraded area 112 of the insulation may not appreciably lose its thermal insulation properties, but if the degraded area 112 is exposed to seawater (e.g., at the ends of the insulation 110), then the insulation 110 can come loose and move away, thereby losing some of its effectiveness as an insulator.

As used herein, a "non-interfacing" surface of insulation refers to a surface of the insulation that does not interface with an equipment unit or other component. In other words, a non-interfacing surface refers to a surface that is exposed to the environment in which it is disposed. For example, in embodiments where a subsea equipment assembly having an insulation covering at least one equipment unit is disposed in a subsea environment, a non-interfacing, or exposed, surface of the insulation may be exposed to seawater at an insulation-seawater interface.

According to embodiments of the present disclosure, designing the placement of insulation around one or more equipment units to prevent each non-interfacing surface of the insulation from being subjected to degradation temperatures may increase the lifetime of the insulation by using the non-degraded (and thus relatively higher structural stability) non-interfacing surfaces of the insulation to retain any inner portions of the insulation that may be degraded. In other words, methods of the present disclosure may include designing and/or applying insulation to one or more equipment units such that each surface of the insulation that does not interface with the equipment units is not exposed to degradation temperatures. For example, designing and applying insulation to subsea structures may include placing the insulation over portions of the subsea structures exposed to temperatures above the degradation temperature of the insulation (hot zones), as well as adjacent portions of the subsea structures exposed to maximum temperatures below the degradation temperature of the insulation (cold zones), such that each insulation-seawater interface is in a cold zone. By extending the insulation to cover portions of the subsea structures that would otherwise not need to be insulated, the insulated cold zone may remain non-degraded and prevent any degraded inner portions of the insulation in a hot zone to be retained.

As used herein, an equipment unit may refer to multiple components assembled together (e.g., a subsea tree, flow loop assemblies, valve block assemblies, subsea manifold, tubing hanger assemblies, hub assemblies, gate valve assemblies, connector assemblies, jumper assemblies, etc.) or to a single component (e.g., a pipe, valve, spool, jumper piping, housing, locking segment, trim fitting, one or more individual components forming the assemblies listed above, etc.). Further, while some embodiments are described herein related to subsea oil and gas operations, methods and insulation systems described herein may also be used on equipment in other industries, for example, on transportation equipment, or other equipment carrying heated mediums that may need to be insulated from cooler surrounding temperatures of the environment.

According to embodiments of the present disclosure, a method of designing an insulated equipment unit may include determining hot and cold zones along the equipment unit and applying an insulation over the equipment unit in the hot zones as well as over the equipment unit in the cold zones bordering the hot zones. For example, designing a subsea equipment assembly having an insulation covering an outer surface of at least one equipment unit may include modeling a temperature profile of the subsea equipment assembly having a fluid within a flow path formed through the equipment unit. The temperature profile may be modeled with the fluid either flowing through the flow path or with the fluid sealed within the flow path (e.g., during shut off periods of production operations). A temperature profile of one or more insulated equipment units may be modeled using computer aided design or analysis programs, such as finite element analysis and computational fluid dynamics, or otherwise determined using calculations based on predicted or measured temperatures of fluid within the equipment unit, predicted or measured temperatures of the surrounding environment, thermal conductivity of the equipment unit, and other properties of the equipment unit (e.g., size, shape).

In some embodiments, a temperature profile may be determined based on data gathered from an already formed insulated equipment assembly. For example, in embodiments related to the design of insulated subsea equipment assemblies, data may be gathered from relevant subsea equipment assemblies that were previously activated or operational, including, for example, temperature measurements of insulated equipment units and fluid therein, which may then be used to design the same or similar subsea equipment assemblies having insulation with an increased lifetime.

Once the temperature profile of one or more insulated equipment units has been modeled or otherwise determined, at least one hot zone along an interface between the insulation and the outer surface of the equipment unit may be identified, where the identified hot zone(s) is exposed to temperatures above a degradation temperature of the insulation. At least one cold zone or area exposed to maximum temperatures lower than the degradation temperature of the insulation and bordering the identified hot zone(s) may also be identified.

An insulated equipment unit may then be designed to have the interface between the insulation and the outer surface of the equipment unit extend across the identified hot zone(s) and into a bordering identified cold zone(s). According to some embodiments, an interface between the insulation and outer surface of an equipment unit may be designed to extend across at least one cold zone bordering at least one identified hot zone, such as by extending the insulation to cover areas of the equipment unit that would otherwise not need insulation or by adding end-pieces adjacent to insulation covering an identified hot zone. As used herein, "end-pieces" may refer to plates, brackets, cap-pieces, or other structures that may be attached around an insulated piece of equipment (e.g., an insulated pipe) at an axial end of the insulation. According to some embodiments, end-pieces may have a thermal conductivity lower than the piece of equipment to which it is attached. According to some embodiment, end-pieces may have a thermal conductivity low enough to inhibit or reduce the transfer of heat from an equipment unit on which the end-piece is attached and/or fluid within the equipment unit. For example, in some embodiments, an end-piece may be formed of plastic. However, in other embodiments, an end-piece may have a relatively higher thermal conductivity. For example, in some embodiments an end-piece may be formed of steel.

Suitable end-pieces may be formed of a material that is capable of withstanding the temperatures of the equipment unit on which the end-piece is attached. End-pieces may also have a shape that entirely covers an end non-interfacing surface of an adjacent insulation. For example, an end-piece may be disposed adjacent to an end non-interfacing surface of insulation and extend a height that is greater than or equal to the thickness of the insulation (where the thickness of the insulation extends from the interface with the equipment unit to an opposite, exterior non-interfacing surface of the insulation). An end-piece may be bonded (e.g., using a bonding agent such as silane coupling agents or other adhesives) to an adjacent surface of the insulation, or an end-piece may be disposed adjacent to (but not bonded to) a surface of the insulation.

Figure 2A:
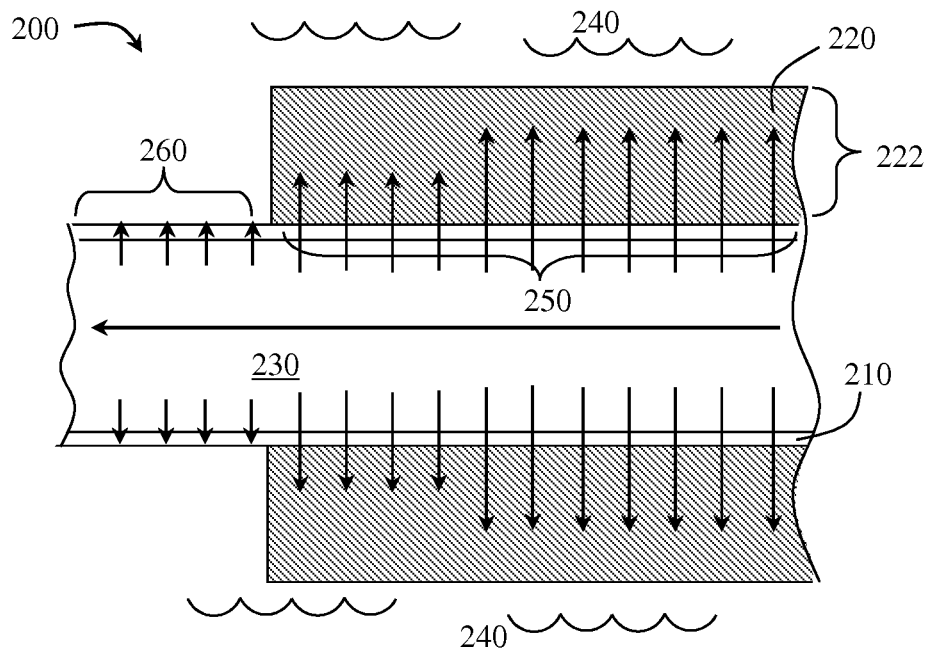
FIGS. 2A and 2B show a method for designing an insulated equipment unit in accordance with embodiments of the present disclosure.
Figure 2B:
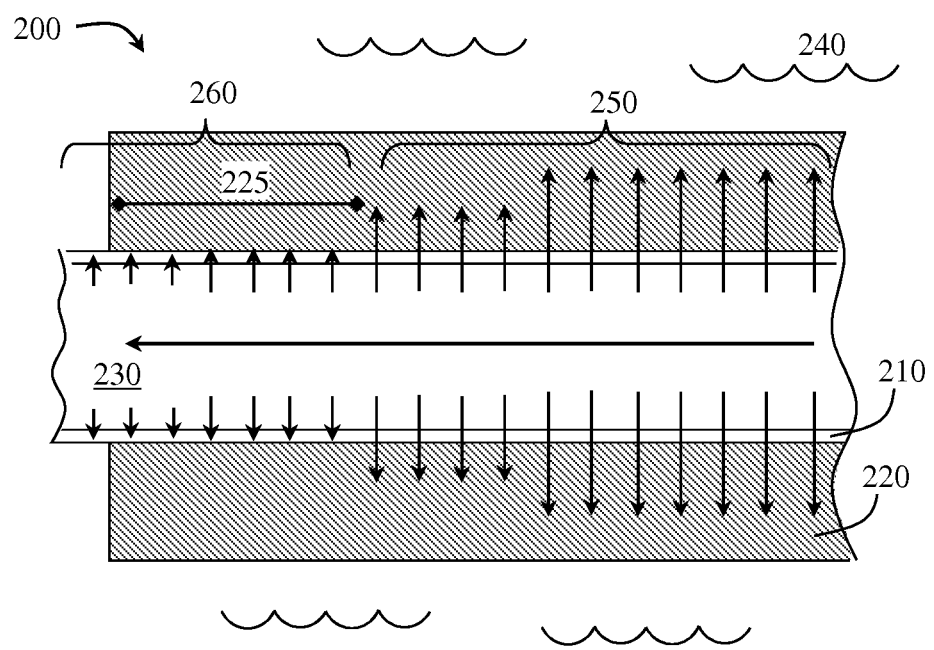

For example, FIGS. 2A and 2B show an example of a method for designing an insulated equipment unit. As shown, the insulated equipment unit 200 may be a pipe 210 having an insulation 220 disposed around the outer surface of the pipe 210 and a fluid 230 flowing therethrough. The temperature of the fluid 230 may be measured or calculated, and may range, for example, between 275° F. (135° C.) to about 450° F. (232° C.). The temperature of the environment 240 surrounding the insulated equipment unit 200 (e.g., seawater) may be colder than the fluid 230 within the pipe 210, and may range, for example, between 32° F. (0° C.) to about 68° F. (20° C.), where a temperature gradient may be formed from the fluid 230 to the outer surface of the pipe 210 (through the pipe wall) and from the fluid 230 into the insulation 220. The fluid 230 may also cool through the pipe 210 as the fluid 230 gets farther away from the fluid source (e.g., a well or reservoir in hydrocarbon production operations). Temperature gradients are represented in FIGS. 2A and 2B by straight arrows, where the direction of the arrow represents a decreasing temperature gradient.

Once the insulated equipment unit 200 is modeled or otherwise produced for examination, as shown in FIG. 2A, hot zones 250 may be identified by measuring, calculating or otherwise determining areas along the outer surface of the pipe 210 that are exposed to temperatures greater than or equal to the degradation temperature of the insulation material. For example, when a silicone-based insulation material having a degradation temperature of about 400° F. (204° C.) is selected for forming the insulation 220, hot zones 250 may be identified as areas along the outer surface of the pipe 210 that are exposed to temperatures of about 400° F. (204° C.) and greater. Bordering cold zones 260 may then be identified by measuring, calculating or otherwise determining areas along the outer surface of the pipe that are exposed to temperatures below the degradation temperature of the insulation material. As described herein, methods for determining hot and cold zones may vary depending on, for example, if the insulated equipment unit is modeled using calculations or computer aided design and analysis programs, if a pre-existing insulated equipment unit is being analyzed, or if data from preexisting insulated equipment units is being used in predictive modeling, and may include, for example, measuring real time temperature values, collecting temperature values from a database, or calculating temperature values based on a modeled performance.

Referring to FIG. 2B, once cold zones 260 bordering the hot zone 250 are determined, the insulation 220 may be extended to cover a selected area of the bordering cold zones 260 in addition to covering the identified hot zones 250. In the embodiment shown in FIG. 2B, the insulation 220 may extend over the identified hot zone 250 and a distance 225 away from the hot zone 250 to cover at least a portion of the identified bordering cold zone 260 along the pipe 210. In other words, the insulation 220 may extend axially farther around the outer surface of the pipe 210 (by the distance 225) than would otherwise be needed for insulating the relatively hotter portions of the pipe 210.

According to some embodiments of the present disclosure, the distance 225 may range from greater than 20 percent of the thickness 222 of the insulation 220 (where the insulation thickness 222 is measured normal from the insulation-equipment interface to an opposite, non-interfacing surface of the insulation 220), greater than 30 percent of the insulation thickness 222, greater than 40 percent of the insulation thickness 222, greater than 50 percent of the insulation thickness 222, greater than 50 percent of the insulation thickness, greater than 60 percent of the insulation thickness 222, greater than 75 percent of the insulation thickness 222, to greater than the thickness 222 of the insulation 220. According to some embodiments of the present disclosure, the distance 225 may range from greater than 6 inches, greater than 8 inches, greater than 10 inches, greater than 20 inches, to greater than 40 inches, depending on, for example, the type of insulation material being used for the insulation, the equipment unit being insulated, the temperature of the surrounding environment, and the properties of the fluid flowing through the equipment, including but not limited to the fluid temperature, fluid flow properties, and fluid composition, which may affect the temperature at which the fluid component parts may form solid deposits.

In some embodiments, regions of temperature zones may have relatively inexact boundaries, for example, where the temperature of the fluid in the equipment unit may change over time or where the temperature of the surrounding environment may change over time. Thus, according to some embodiments of the present disclosure, a hot zone may be determined to include areas subjected to temperatures greater than or equal to temperatures within a 5° F. (3° C.) range from the degradation temperature of the insulation, or in some embodiments, to include areas subjected to temperatures greater than or equal to temperatures within a 10° F. (6° C.) range from the degradation temperature of the insulation, or in yet other embodiments, to include areas subjected to temperatures greater than or equal to temperatures within a 25° F. (14° C.) range from the degradation temperature of the insulation. According to other embodiments, temperatures approaching the degradation temperature of the insulation, for example, temperatures within 5° F. (3° C.) from the degradation temperature, within 10° F. (6° C.) of the degradation temperature, or within 25° F. (14° C.) of the degradation temperature, may be referred to as a transition region between an identified hot zone and a bordering cold zone. In embodiments where a transition region is defined between an identified hot zone and a bordering cold zone, the insulation may cover the equipment unit in the identified hot zone, the transition region, and at least a portion of the cold zone.

According to some embodiments, a hot zone and/or a transition region between a hot zone and cold zone may be determined based on average temperature measurements of the fluid in the equipment unit. According to some embodiments, a hot zone and/or a transition region may be determined based on maximum temperature measurements of the fluid in the equipment unit. Further, a margin of error may be selected when measuring or calculating temperatures for determining hot and cold zones.

For example, according to some embodiments, a method of designing an insulated equipment unit may include extending the insulation to cover the equipment unit in both an identified hot zone and a bordering identified cold zone by covering a transition from a portion of the outer surface of the equipment unit exposed to temperatures approximately equal to or above the degradation temperature to a portion of the outer surface exposed to maximum temperatures below the degradation temperature with the insulation, where the identified temperature regions may be determined based on, for example, theoretically calculated temperatures, average temperature measurements, or on maximum temperature measurements.

By extending insulation to cover additional (and relatively colder) portions of an equipment unit, the portion of the insulation covering the bordering cold zones (and thus not subjected to degradation temperatures) may retain its structure for a longer period of time, and thereby retain any interior portions of the insulation (e.g., portions of the insulation in hot zones) that degrades from exposure to temperatures greater than or equal to the insulation's degradation temperature.

According to some embodiments of the present disclosure, an insulated equipment unit may include at least one cold zone bordering an identified hot zone along the interface between the insulation and the equipment unit by providing the equipment unit with at least one end-piece adjacent to the insulation, where the interface between the insulation and the at least one end-piece forms at least one cold zone exposed to maximum temperatures below the degradation temperature of the insulation. In such embodiments, an end-piece may form a cold zone by having a thermal conductivity low enough to inhibit the transfer of heat from the outer surface of the equipment unit with fluid therein across its height, such that the tallest portions of the end-piece (portions of the end-piece located farthest from the equipment unit on which the end-piece is attached) are subjected to maximum temperatures below the degradation temperature of the insulation. In other words, when the tallest portions of an end-piece adjacent to an axial end of insulation are subjected to maximum temperatures below the degradation temperature of the insulation, such portions may form cold zones bordering identified hot zones of the insulation.

Figure 3:
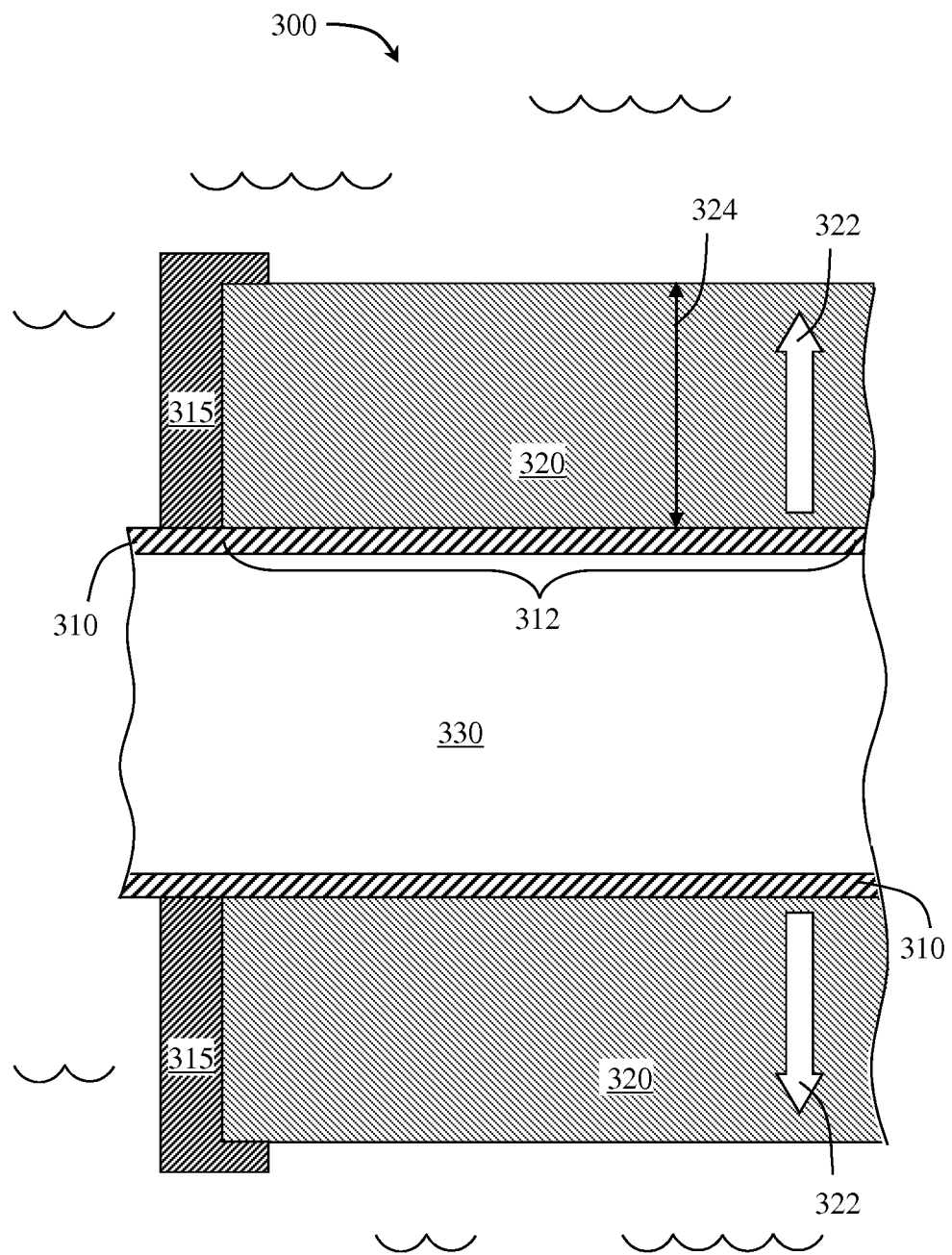
FIG. 3 shows a cross sectional view of an insulated equipment unit in accordance with embodiments of the present disclosure.

For example, FIG. 3 shows a cross sectional view of a designed insulated equipment unit 300, where the equipment unit 300 includes a pipe 310 and an end-piece 315 disposed around the pipe 310. An insulation 320 may be disposed around the outer surface of the pipe 310 along an identified hot zone 312 of the interface between the insulation 320 and pipe 310 that is exposed to temperatures equal to or greater than the degradation temperature of the insulation 320. The end-piece 315 may have a low thermal conductivity to inhibit or reduce the transfer of heat from the pipe 310 and/or fluid 330 within the pipe 310. For example, material forming the end-piece 315 may be selected to have a thermal conductivity equal to or lower than the thermal conductivity of steel, including but not limited to, carbon steels, tool steels, and other alloyed steels. According to some embodiments of the present disclosure, an end-piece may have a thermal conductivity of about 60 W/(mK) (34.7 BTU/(hr-ft-° F.)) or less, about 55 W/(mK) (31.8 BTU/(hr-ft-° F.)) or less, about 50 W/(mK) (28.9 BTU/(hr-ft-° F.)) or less, about 45 W/(mK) (26.0 BTU/(hr-ft-° F.)) or less, about 35 W/(mK) (20.2 BTU/(hr-ft-° F.)) or less, about 25 W/(mK) (14.5 BTU/(hr-ft-° F.)) or less, or about 18 W/(mK) (10.4 BTU/(hr-ft-° F.)) or less. However, according to other embodiments, an end-piece may have a thermal conductivity greater than that of the equipment unit on which it is attached.

Elevated temperatures of fluid 330 within the pipe 310 may create a temperature gradient 322 through the wall of the pipe 310 and into the insulation 320, where portions of the insulation 320 adjacent to and proximate to the outer surface of the pipe 310 may be subjected to the elevated temperatures and non-interfacing surfaces of the insulation may be subjected to cooler temperatures. For example, in embodiments having a fluid that heats the outer surface of the pipe 310 to temperatures equal to or greater than the degradation temperature of the insulation 320, portions of the insulation 320 adjacent to and proximate to the outer surface of the pipe 310 may be subjected to temperatures greater than or equal to the degradation temperature of the insulation (and thus may result in degradation initiation of the insulation 320), portions of the insulation 320 along non-interfacing surfaces with pipe (e.g., insulation-seawater interfaces, or other outer and exposed surfaces of the insulation) and portions of the insulation 320 proximate to the non-interfacing surfaces may be subjected to maximum temperatures below the degradation temperature of the insulation, and portions of the insulation 320 between the pipe interface and non-interfacing surfaces may have a temperature gradient 322 formed there between.

According to embodiments of the present disclosure, the insulation 320 may be designed to have a thickness 324 measured from the interface between the insulation 320 and pipe 310 to an opposite non-interfacing surface of the insulation 320, such that the non-interfacing surface is exposed to maximum temperatures below the degradation temperature of the insulation 320. According to some embodiments, at least 20 percent of the thickness 324 measured from the non-interfacing surface along at least a portion of the insulation 320 covering the equipment unit in the hot zone 312 may be exposed to maximum temperatures below the degradation temperature of the insulation. According to some embodiments, at least 30 percent of the thickness 324 measured from the non-interfacing surface may be exposed to maximum temperatures below the degradation temperature. According to some embodiments, at least 40 percent of the thickness 324 measured from the non-interfacing surface may be exposed to maximum temperatures below the degradation temperature. According to some embodiments, at least 50 percent of the thickness 324 measured from the non-interfacing surface may be exposed to maximum temperatures below the degradation temperature. The thickness of the insulation along its non-interfacing surfaces that is exposed to maximum temperatures below the degradation temperature may vary depending on, for example, the total thickness of the insulation, the insulation material, or the temperature of the surrounding environment.

According to embodiments of the present disclosure, the shape and size (including length and thickness) of the insulation may be designed such that each non-interfacing surface of the insulation, as well as exterior portions extending a thickness from each non-interfacing surface, are prevented from being exposed to degradation temperatures for time periods significant enough to degrade the structural integrity of the exterior portions. For example, the insulation shape and size may be designed such that each non-interfacing surface and exterior portion extending a selected thickness from the non-interfacing surfaces are exposed to maximum temperatures below the degradation temperature of the insulation. In other embodiments, the insulation shape and size may be designed such that each non-interfacing surface and exterior portion extending a selected thickness from the non-interfacing surfaces are exposed to maximum temperatures within a selected range (e.g., within ±20° C. (36° F.), within ±10° C. (18° F.), or within ±5° C. (9° F.)) of the degradation temperature of the insulation for a short enough period of time that the exterior portions do not lose their shape.

Different types of insulation material may experience distinct degradation mechanisms when exposed to elevated temperatures, and the extent of such degradation may depend on the temperature and the amount of time the insulation material is subjected to the elevated temperatures. For example, in some embodiments, an exterior portion of insulation may be subjected to temperatures equal to or close to the degradation temperature of the insulation material for a period of time short enough to where the structural integrity of the insulation is maintained and may hold its shape. Thus, the insulation may be designed such that each exterior, non-interfacing surface of the insulation is prevented or inhibited from being subjected to conditions (temperature level and duration) that degrade the insulation to an extent where the exterior portions of the insulation may not hold its shape. In other words, the insulation may be designed and applied to an equipment unit such that each exterior, non-interfacing surface of the insulation is subjected to conditions (temperature level and duration) that maintain the structural integrity of the exterior portions of the insulation, and thus, the exterior portions of the insulation may retain or support any degraded interior portions of the insulation.

Further, according to embodiments of the present disclosure, the type of insulation material may be selected to have one or more desired properties, including for example, density, tensile strength and elongation, modulus, and the temperature critical to accelerated degradation (degradation temperature). For example, insulation material may be selected to have a degradation temperature ranging from a lower limit selected from 100° C. (212° F.), 120° C. (248° F.), 140° C. (284° F.), 160° C. (320° F.), 180° C. (356° F.), and 200° C. (392° F.) to an upper limit selected from 140° C. (284° F.), 180° C. (356° F.), 225° C. (437° F.), 250° C. (482° F.), 275° C. (527° F.) and 300° C. (572° F.), where any lower limit may be used in combination with any upper limit. According to some embodiments, insulation material may be selected from a silicone rubber based material. Insulation material suitable for embodiments of the present disclosure may have a density equal to the density of the surrounding environment or close to (e.g., within 5%, 10% or 15% difference) the density of the surrounding environment. For example, in some embodiments, the insulation material may have a density that is approximately equal to the density of a surrounding environment of seawater.

When insulation material and location around one or more equipment units has been designed and/or modeled, the designed insulated equipment units may be assembled. For example, according to embodiments of the present disclosure, a designed subsea equipment assembly may be assembled, wherein assembling includes providing the insulation around at least one assembled equipment unit, such that the insulation has at least one interfacing surface interfacing with an equipment unit and at least one non-interfacing surface, where each non-interfacing surface is exposed to maximum temperatures below the degradation temperature of the insulation.

Methods according to embodiments of the present disclosure may include, providing at least one equipment unit having a flow path extending therethough, identifying portions along an outer surface of the at least one equipment unit exposed to temperatures above a degradation temperature of an insulation material, and disposing the insulation material around the outer surface to cover the portions exposed to temperatures above the degradation temperature and to cover adjacent portions of the outer surface exposed to maximum temperatures below the degradation temperature.

For example, according to some embodiments, insulation material may be disposed around the outer surface of one or more assembled together equipment units by providing a mold around at least one equipment unit and spaced apart from the outer surface, filling the mold with the insulation material, and curing the insulation material. In embodiments using an end-piece for retaining insulation, the end-piece may be attached to or formed with an equipment unit prior to providing a mold around the equipment unit, and once the mold is provided around the equipment unit and end-piece, the mold may be filled with the insulation material and cured, such that an end of the cured insulation is adjacent to the end-piece. In some embodiments using an end-piece for retaining insulation, the end-piece may be attached to an equipment unit after providing a mold around the equipment unit, filling the mold with insulation material and curing the insulation material, where the end-piece may be attached to the equipment unit adjacent to an end non-interfacing surface of the cured insulation. Other ways of selectively disposing insulation material around one or more assembled together equipment units may also be used.

Assembled equipment units may include, for example, subsea equipment assemblies used in hydrocarbon production, which may include piping, subsea manifolds, and other equipment units having a flow path flowing therethrough. In some subsea equipment assemblies, a flow path may extend through a well head, through one or more trees, through one or more flow loops or jumpers off the tree to a subsea manifold, and then through risers to the sea surface.

According to some embodiments, a subsea equipment assembly may include a plurality of equipment units, a flow path extending through at least one of the equipment units, and an insulation having a thickness measured from an interface between the insulation and an outer surface of the at least one equipment unit to an exterior of the insulation and at least one cold zone interface surface interfacing with a portion of an equipment unit outer surface exposed to maximum temperatures below a degradation temperature of the insulation, where the cold zone interface surface borders a hot zone of the interface exposed to temperatures above the degradation temperature of the insulation.

In some embodiments, a subsea equipment assembly may include a plurality of equipment units, an insulation disposed adjacent to an outer surface of at least one of the equipment units, the insulation having at least one non-interfacing surface, where each non-interfacing surface is exposed to maximum temperatures below a degradation temperature of the insulation and an interface between the insulation and the outer surface of the equipment having a hot zone exposed to temperatures above the degradation temperature of the insulation. The interface may include at least one cold zone bordering the hot zone, where the cold zone is exposed to maximum temperatures below the degradation temperature of the insulation. The cold zone may be formed, for example, by assembling an end-piece adjacent to the insulation and a low temperature environment (e.g., low temperature seawater), or by extending the insulation to cover regions of the assembled equipment units that are subjected to maximum temperatures below the degradation temperature of the insulation.

Figure 4:
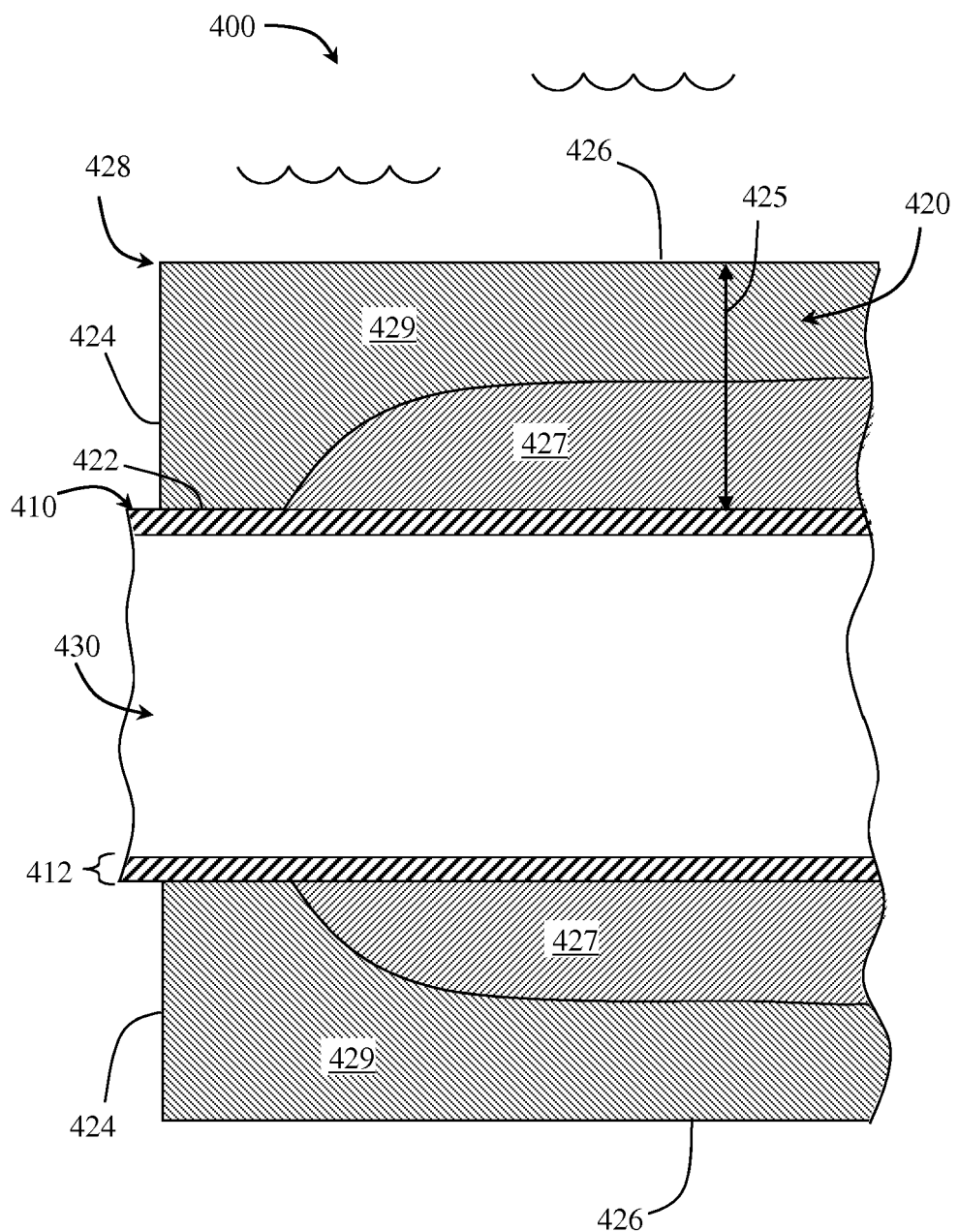
FIG. 4 shows a cross sectional view of an insulated equipment unit in accordance with embodiments of the present disclosure.

FIG. 4 shows a cross sectional, partial view of an insulated equipment unit 400 having insulation 420 disposed around the outer surface of an equipment unit 410, the insulation 420 extending a length along the equipment unit 410 and having a thickness measured from an interface with the equipment unit to an opposite and outer surface of the insulation 420. As shown, the insulation 420 has at least one interface surface 422 interfacing with the equipment unit 410 and at least one non-interfacing surface 424, 426 that does not interface with the equipment unit 410. The length of the insulation 420 terminates at an end non-interfacing surface 424, and the thickness 425 of the insulation 420 extends from the interface with the equipment unit 410 to an opposite, exterior non-interfacing surface 426. The end non-interfacing surface 424 and exterior non-interfacing surface 426 intersect at an edge 428 (e.g., forming an obtuse intersecting angle, a right angle or an acute angle). In other embodiments, a bevel or curved transition may be formed at the intersection of the end non-interfacing surface 424 and the outer non-interfacing surface 426.

The equipment unit 410 may have flow path 430 extending therethrough, where heated fluid may flow through the flow path 430 or may be stored within the flow path 430, or the flow path 430 may be subjected to other heated environments, such as a heated gas. Portions of the insulation 420 adjacent to the equipment unit 410 may be subjected to increased temperatures when the flow path 430 is heated, for example, by a heated fluid within the flow path 430. In the embodiment shown, interior portions 427 of the insulation 420 may be subjected to increased temperatures greater than or equal to the degradation temperature of the insulation, while exterior portions 429 of the insulation 420 may be subjected to maximum temperatures below the degradation temperature of the insulation 420.

As shown, the thickness of the interior portion 427 (measured from the interface between the insulation 420 and equipment unit) may gradually increase along a portion of the length of the insulation 420. For example, the interior portion 427 may initiate a distance from the end non-interfacing surface 424 and along the interface surface 422, and the thickness of the interior portion 427 may increase as the distance from the end non-interfacing surface 424 increases until the thickness of the interior portion 427 reaches a maximum thickness. The maximum thickness of the interior portion 427 may reach 80 percent of the insulation thickness 425, 70 percent of the insulation thickness 425, 60 percent of the insulation thickness, or less, depending on, for example, the insulation material selected to form the insulation, the temperatures of the surrounding environment, and the temperatures the flow path is subjected to.

Further, in the embodiment shown in FIG. 4, the wall 412 of the equipment unit 410 has a uniform thickness (measured between the surface forming the flow path and the outer surface). However, in some embodiments, an equipment unit or component of an equipment unit having a flow path formed therein may have a wall with varying thickness along the length of the flow path. For example, the wall of a pipe may be thinner than the wall of a connector or fitting attached to an end of the pipe, or a single component of an equipment unit may have a wall with varying thickness. In embodiments having an equipment unit with a varying wall thickness defining a flow path formed through one or more components of the equipment unit, insulation having a relatively uniform thickness may be disposed around the equipment unit, or insulation having a varying thickness may be disposed around the equipment unit. For example, in some embodiments, an insulation having relatively uniform thickness may be disposed around an equipment unit such that the outer, non-interfacing surface of the insulation has a corresponding geometry with the outer surface of the equipment unit around which the insulation is disposed. In some embodiments, an insulation disposed around an equipment unit having a varying wall thickness that defines a flow path though the equipment unit may be relatively thinner around portions of equipment unit with a relatively thicker wall, and the insulation may be relatively thicker around portions of the equipment unit with a relatively thinner wall.

By designing and forming insulation systems according to embodiments of the present disclosure, the thermal properties of the insulation system may be maintained and the insulation system may remain in place over the lifetime of the insulation. For example, by designing each exposed or non-interfacing surface of the insulation to be in locations along the equipment assembly that are not subjected to temperatures equal to or greater than the insulation material degradation temperature for prolonged periods of time, such as described herein, the structure of the non-interfacing surfaces of the insulation may be maintained, which may thereby maintain the overall structure of the insulation system and retain any interior portions of the insulation that may be degraded. When insulation material is selected that maintains thermal properties in degraded state, interior portions of the insulation that are degraded and retained by non-degraded exterior portions of the insulation may maintain the thermal properties of the insulation system.

While the disclosure has been described above with respect to a limited number of embodiments, those skilled in the art, having the benefit of this disclosure, will appreciate that other embodiments can be devised which do not depart from the scope of the disclosure as disclosed herein. Accordingly, the scope of the disclosure should be limited only by the attached claims.

What is claimed is:

1. A method, comprising:
   designing a subsea equipment assembly comprising an insulation covering an outer surface of at least one equipment unit and a flow path formed through the at least one equipment unit, the designing comprising:
   modeling a temperature profile of the subsea equipment assembly having a fluid within the flow path;
   identifying at least one hot zone along the outer surface, where the at least one hot zone is exposed to temperatures above a degradation temperature of the insulation;
   designing the insulation to cover the at least one hot zone and to be exposed to temperatures above the degradation temperature of the insulation; and
   designing the insulation to extend a distance outside the at least one hot zone into at least one cold zone by extending the insulation in a direction parallel with the flow path and extending the insulation in a direction radially from the flow path to surround the at least one hot zone,
   the at least one cold zone exposed to maximum temperatures below the degradation temperature of the insulation;
   wherein the insulation covering the at least one hot zone is completely surrounded by the outer surface of the equipment unit and the insulation in the at least one cold zone.

2. The method of claim 1, wherein designing at least one cold zone comprises covering a transition from a portion of the outer surface exposed to temperatures above the degradation temperature to a portion of the outer surface exposed to maximum temperatures below the degradation temperature with the insulation.

3. The method of claim 1, wherein designing at least one cold zone comprises providing the at least one equipment unit with at least one end-piece adjacent the insulation, where an interface between the insulation and the at least one end-piece forms the at least one cold zone.

4. The method of claim 3, further comprising selecting an end-piece comprising steel.

5. The method of claim 1, further comprising designing the insulation to have a thickness measured from an interface between the insulation and the outer surface to at least one non-interfacing surface, such that each non-interfacing surface is exposed to maximum temperatures below the degradation temperature of the insulation.

6. The method of claim 5, wherein at least 30 percent of the thickness measured from the non-interfacing surface along a portion of the insulation covering the at least one hot zone is exposed to maximum temperatures below the degradation temperature.

7. The method of claim 1, further comprising assembling the designed subsea equipment assembly, wherein assembling comprises providing the insulation around the at least one equipment unit, such that the insulation comprises at least one interfacing surface forming a portion of an interface between the insulation and the outer surface and at least one non-interfacing surface, each non-interfacing surface exposed to maximum temperatures below the degradation temperature of the insulation.

8. The method of claim 1, further comprising selecting an insulation material having the degradation temperature ranging from 100° C. to 300° C. to form the insulation.

9. The method of claim 1, wherein modeling comprises determining a fluid temperature profile of the fluid and the thermal conductivity of the at least one equipment unit around the flow path.

10. A method, comprising:
    providing at least one equipment unit having a flow path extending therethrough;
    identifying portions along an outer surface of the at least one equipment unit exposed to temperatures above a degradation temperature of an insulation material;
    disposing the insulation material around the outer surface to cover the portions exposed to temperatures above the degradation temperature and to cover adjacent portions of the outer surface exposed to maximum temperatures below the degradation temperature;
    heating the insulation material around the portions exposed to temperatures above the degradation temperature to degrade the insulation material; and
    retaining the degraded insulation material within non-degraded insulation material around the adjacent portions exposed to temperatures below the degradation temperature, wherein the degraded insulation material is surrounded by the outer surface of the equipment unit and the non-degraded insulation material.

11. The method of claim 10, further comprising disposing the insulation material adjacent to at least one end-piece, the at least one end-piece forming at least one of the adjacent portions exposed to maximum temperatures below the degradation temperature.

12. The method of claim 11, wherein the at least one end-piece has a thermal conductivity of about 45 W/(mK) or less.

13. The method of claim 10, wherein the adjacent portions extend at least about 6 inches from the portions exposed to temperatures above the degradation temperature.

14. The method of claim 10, wherein disposing the insulation material around the outer surface comprises:
    providing a mold around the at least one equipment unit and spaced apart from the outer surface;
    filling the mold with the insulation material; and
    curing the insulation material.

15. The method of claim 10, where the at least one equipment unit comprises piping.

16. A subsea equipment assembly, comprising:
    an insulation disposed adjacent to an outer surface of at least one equipment unit, the insulation comprising:
    a portion of the insulation in a hot zone that is exposed to temperatures above a degradation temperature of the insulation; and
    a second portion of the insulation in at least one cold zone that is exposed to maximum temperatures below the degradation temperature of the insulation;
    wherein the portion of the insulation in the hot zone is completely surrounded by the second portion of the insulation in the at least one cold zone and the outer surface of the at least one equipment unit, the second portion of the insulation in the at least one cold zone extending from the portion of the insulation in the at least one hot zone in a direction parallel to the outer surface and in a direction radially from the outer surface to surround the at least one hot zone.

17. The assembly of claim 16, wherein the at least one equipment unit includes at least one end-piece disposed adjacent to the insulation, the at least one end-piece having a thermal conductivity of about 45 W/(mK) or less.

18. The assembly of claim 16, wherein the insulation in the at least one cold zone extends at least about 6 inches from at least one non-interfacing surface of the insulation that does not interface with the at least one equipment unit.

19. The assembly of claim 16, wherein the insulation has a thickness measured radially outward from the outer surface to a non-interfacing surface of the insulation that does not interface with the at least one equipment unit, wherein at least 30 percent of the thickness from the non-interfacing surface is exposed to maximum temperatures below the degradation temperature.

20. The assembly of claim 16, wherein the insulation comprises a silicone rubber based material.

* * * * *